United States Patent
Liles

(10) Patent No.: US 11,772,642 B2
(45) Date of Patent: Oct. 3, 2023

(54) METHOD AND APPARATUS FOR SIGNALING TURN SAFETY

(71) Applicant: Karina Liles, Columbia, SC (US)

(72) Inventor: Karina Liles, Columbia, SC (US)

(*) Notice: Subject to any disclaimer, the term of this patent is extended or adjusted under 35 U.S.C. 154(b) by 29 days.

(21) Appl. No.: 15/626,994

(22) Filed: Jun. 19, 2017

(65) Prior Publication Data
US 2018/0362036 A1    Dec. 20, 2018

(51) Int. Cl.
| | |
|---|---|
| *G08G 1/16* | (2006.01) |
| *B60W 30/095* | (2012.01) |
| *B60W 50/14* | (2020.01) |
| *G08G 1/0962* | (2006.01) |

(52) U.S. Cl.
CPC ........ *B60W 30/0956* (2013.01); *B60W 50/14* (2013.01); *G08G 1/0962* (2013.01); *G08G 1/166* (2013.01); *G08G 1/167* (2013.01); *B60W 2050/146* (2013.01); *B60W 2554/80* (2020.02); *B60W 2555/60* (2020.02); *B60W 2754/10* (2020.02)

(58) Field of Classification Search
CPC ...... G08G 1/0962; G08G 1/166; G08G 1/167; B60W 30/0956; B60W 50/14; B60W 2750/30; B60W 2550/30; B60W 2550/22
USPC .......................................... 701/119; 340/907
See application file for complete search history.

(56) References Cited

U.S. PATENT DOCUMENTS

| | | | | |
|---|---|---|---|---|
| 8,825,350 B1* | 9/2014 | Robinson | ........... | G06K 9/00785 |
| | | | | 701/117 |
| 2005/0143889 A1* | 6/2005 | Isaji | ........................ | G08G 1/161 |
| | | | | 701/70 |
| 2006/0181433 A1* | 8/2006 | Wolterman | .............. | G08G 1/08 |
| | | | | 340/917 |
| 2011/0316719 A1* | 12/2011 | Obuchi | ............ | G08G 1/096783 |
| | | | | 340/917 |
| 2012/0179518 A1* | 7/2012 | Jaipaul | .................... | G08G 1/164 |
| | | | | 705/14.4 |
| 2016/0027300 A1* | 1/2016 | Raamot | ................ | G08G 1/0145 |
| | | | | 340/922 |
| 2017/0072853 A1* | 3/2017 | Matsuoka | .............. | B60Q 9/008 |
| 2018/0089997 A1* | 3/2018 | Ho | .......... | G08G 1/164 |
| 2018/0190111 A1* | 7/2018 | Green | .................... | G08G 1/052 |

FOREIGN PATENT DOCUMENTS

| | | | |
|---|---|---|---|
| JP | S59-198000 | * | 11/1984 |
| JP | 09270097 A | * | 10/1997 |
| JP | 2005284669 A | * | 10/2005 |
| KR | 1020120013700 A | * | 2/2012 |

OTHER PUBLICATIONS

English Translation: Sannomiya, JP H09270097 A, Oct. 1997, Japanese Patent Office Publication (Year: 1997).*

(Continued)

*Primary Examiner* — Nadeem Odeh
(74) *Attorney, Agent, or Firm* — Ballard Spahr LLP

(57) ABSTRACT

Disclosed are methods and apparatuses for signaling turn safety. One or more sensor readings can be received. The one or more sensor readings can be compared to one or more thresholds. A signal can be provided to one or more visual indicators based on whether the one or more sensor readings satisfy the one or more thresholds.

9 Claims, 5 Drawing Sheets

(56) References Cited

OTHER PUBLICATIONS

English Translation: Segawa, JP 2005284669 A, Oct. 2005, Japanese Patent Office Publication (Year: 2005).*
English Translation: Washimi, JP S59-198000 A, Nov. 9, 1984, Japanese Patent Office Publication (Year: 1984).*
English Translation: Lee, KR 1020120013700 A, Feb. 15, 2012, Korean Patent Office Publication (Year: 2012).*

* cited by examiner

METHOD AND APPARATUS FOR SIGNALING TURN SAFETY

BACKGROUND

Drivers are allowed to make turns crossing a lane of oncoming traffic. However, drivers rely on their visual perception to gauge the risk in making such a turn. This exposes the driver to risks associated with misestimating the distance and/or speed of oncoming traffic, thereby creating a possibility of an accident.

SUMMARY

It is to be understood that both the following general description and the following detailed description are exemplary and explanatory only and are not restrictive. Provided are methods and systems for signaling turn safety. In an aspect, a method can comprise receiving, from one or more sensors configured to monitor one or more lanes of oncoming traffic, one or more sensor readings; determining whether one or more thresholds associated with the one or more sensor readings is satisfied; and providing a first signal to a first visual indicator in response to the one or more thresholds being satisfied, wherein the first visual indicator indicates a potential to cross, during a turn, the one or more lanes of oncoming traffic by a vehicle.

In an aspect, an apparatus can comprise one or more sensors configured to monitor one or more lanes of oncoming traffic; one or more visual indicators; a controller configured to at least: receive, from the one or more sensors, one or more sensor readings; determine whether one or more thresholds associated with the one or more sensor readings is satisfied; and provide a first signal to a first visual indicator of the one or more visual indicators in response to the one or more thresholds being satisfied, wherein the first visual indicator indicates a potential to cross, during a turn, the one or more lanes of oncoming traffic by a vehicle.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
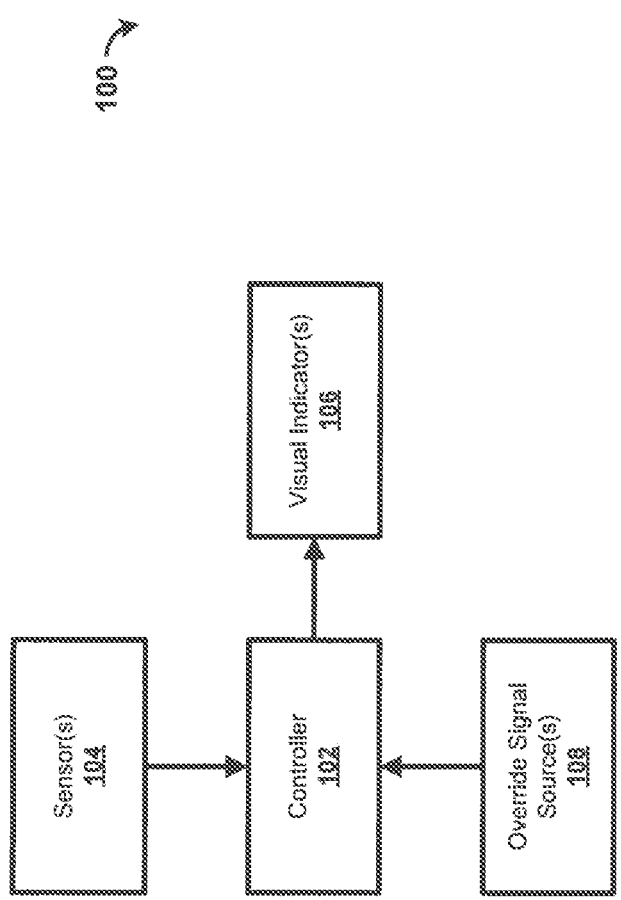
FIG. 1 is a block diagram of an example apparatus.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc, of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to a method and apparatus for turn safety, in many jurisdictions it is legal for a driver of a vehicle, e.g. an automobile, to make turns that cross one or more lanes of oncoming traffic. As an example, in a jurisdiction in which vehicles travel on the right side of the road, a vehicle can make a left hand turn crossing one or more left-most lanes of oncoming traffic. In such an example, in the absence of a dedicated signal from a traffic controller indicating permission to turn, e.g. an advanced green turn signal, a driver must rely on their visual perception to determine if it is safe to cross the lane of oncoming traffic. Generally, this can include a driver determining if any oncoming traffic is visible and/or estimating if any visible oncoming traffic will enter an intersection while the given vehicle is turning. This approach is open to human error, creating a risk for collisions with oncoming traffic by the turning vehicle.

An apparatus can include one or more sensors configured to monitor one or more lanes of oncoming traffic. The one or more sensors can include distance sensors, speed sensors, or other sensors as can be appreciated. The apparatus can also include a controller to receive one or more sensor readings from the one or more sensors. Based on the one or more sensor readings, the controller can determine if one or more thresholds are satisfied. For example, the controller can determine if a distance reading from a distance sensor satisfies a distance threshold. As another example, the controller can determine if a speed reading from a speed sensor satisfies a speed threshold. As a further example, the controller can calculate, based on a distance reading and a speed reading, a time value estimating a time until a vehicle in oncoming traffic enters an intersection or crosses some other distance threshold. The controller can then determine if the time value satisfies the time threshold.

If the one or more thresholds are satisfied, the controller can provide a first signal to a first visual indicator indicating that performing a turn across the one or more lanes of oncoming traffic is safe. In an aspect, if the one or more thresholds are not satisfied, the controller can provide a second signal to a second visual indicator cautioning against a turn across the one or more lanes of oncoming traffic. In an aspect, the first and second visual indicators can correspond to one or more text displays, lights including colored lights, or other visual signals.

FIG. 1 illustrates a block diagram of an example apparatus 100. Included in the apparatus 100 is a controller 102. The controller 102 can comprise a computing device as set forth in FIG. 4. The controller 102 can also comprise dedicated circuitry, logic, solid state devices, computer-readable media, logic gates, signal processing apparatuses, or other signal processing components as can be appreciated. The controller 102 is communicatively coupled to one or more sensors 104. The one or more sensors 104 can be configured to provide one or more sensor readings to the controller 102. In an aspect, the one or more sensors 104 can include speed sensors, distance sensors, motion sensors, combinations thereof, or other sensors as can be appreciated. The one or more sensors 104 can include light-based sensors, sound-based sensors, or other types of sensors.

In an aspect, the one or more sensors 104 can include one or more first sensors configured to monitor one or more lanes of oncoming traffic. For example, the one or more first sensors 104 can be directed such that their range of detection encompasses a portion of the one or more lanes of oncoming traffic. In another aspect, the one or more sensors 104 can include one or more second sensors configured to monitor a pedestrian crossing parallel to one or more lanes of oncoming traffic, e.g. a pedestrian crossing that would be crossed by a vehicle turning across the one or more lanes of oncoming traffic. For example, the one or more second sensors 104 can be directed such that their range of detection encompasses the pedestrian crossing. In an aspect, the one or more sensors 104 can be calibrated based on a size of objects to be detected. For example, the one or more first sensors 104 can be calibrated to detect objects approximating a vehicle size (e.g. motorcycle, automobile) or greater, while the one or more second sensors 104 can be calibrated to detect objects approximating the size of a person, or greater.

The controller 102 can be configured to determine whether one or more thresholds are satisfied based on the one or more sensor readings, in an aspect, a threshold can be considered satisfied if a value compared against the threshold equals the threshold, falls above the threshold, or falls below the threshold, depending on the configuration of the controller 102 and the corresponding value. This can include determining whether the one or more thresholds are satisfied by the one or more sensor readings. For example, the controller 102 can determine if a distance threshold is satisfied by a sensor reading by a distance sensor. As another example, the controller 102 can determine if a speed threshold is satisfied by a sensor reading from a speed sensor. This can also include determining whether the one or more thresholds are satisfied based on one or more values calculated based on the one or more sensor readings. For example, the controller 102 can calculate, based on a sensor reading from a distance sensor and a sensor reading from a speed sensor, an estimated time for an object to cover a distance. The distance can correspond to a distance from the object to the apparatus, a distance from the object to an entrance into an intersection, or a distance from the object to another point. The controller 102 can then determine if the time value satisfies a time threshold. As a further example, the controller 102 can determine if a combination of thresholds are satisfied by a combination of sensor readings. For example, the controller 102 can determine if a distance reading falls below a distance threshold and a speed reading falls above a speed threshold, indicating that a nearby vehicle is approaching the intersection, thereby differentiating vehicles that are nearby but not approaching the intersection, e.g. a parked vehicle.

In an aspect, the controller 102 can provide signals to one or more visual indicators 106 based on whether the one or more thresholds are satisfied. In an aspect, the visual indicators 106 can comprise text displays, colored lights, signs, or other approaches for providing a visual signal to a vehicle operator potentially turning across the one or more lanes of oncoming traffic. Thus, providing the signal to the one or more visual indicators 106 activates the respective visual indicator, e.g. turning on a light, providing text data to a text display, activating one or more lights to form a design or shape of the visual indicator, etc. In an aspect, the visual indicators 106 can include a first visual indicator indicating that crossing the one or more lanes of oncoming traffic is safe for a turning vehicle, e.g. a yellow or amber light. Thus, the controller 102 can provide a signal to the first visual indicator if the one or more thresholds are satisfied, in an aspect, the visual indicators 106 can include a second visual indicator indicating that crossing the one or more lanes of oncoming traffic is unsafe for a turning vehicle, e.g. a red light. Thus, the controller 102 can provide a signal to the second visual indicator if the one or more thresholds are unsatisfied, e.g. a distance reading falls below a distance threshold, or a time value falls below a time threshold.

In an aspect, the visual indicators 106 can include a third visual indicator indicating that crossing the one or more lanes of oncoming traffic is safe for a turning vehicle, e.g. a green light, in response to one or more second thresholds being satisfied. In an aspect, the one or more second thresholds can be greater than one or more first thresholds used to determine whether the signal to the first visual indicator should be provided. Thus, the controller 102 can provide a signal to the third visual indicator a greater threshold is satisfied, e.g. a distance reading falls above a greater second threshold, provide a signal to the first visual indicator when the distance reading falls below the second threshold and above a first threshold, and provide a signal to the second visual indicator when the distance reading falls below the first (and therefore also the second) threshold.

In an aspect, the controller 102 can provide signals to the one or more visual indicators 106 based whether a combination of first thresholds corresponding to first sensors 104 and second thresholds corresponding to second sensors 104 are satisfied. For example, one or more first thresholds corresponding to first sensors monitoring one or more lanes of oncoming traffic are satisfied, thereby indicating that a vehicle is safe from oncoming traffic should it turn. However, one or more second thresholds corresponding to second sensors monitoring a pedestrian crosswalk can be unsatisfied, indicating one or more persons or other objects in the pedestrian crosswalk. In such an example, a signal would not be provided to the first visual indicator as performing the turn is unsafe due to objects in the pedestrian crosswalk. In such an example, as signal can be provided to the second visual indicator, indicating that it is unsafe to turn over the oncoming traffic.

In an aspect, the controller 102 can receive one or more override signals from one or more override signal sources 108. The controller 102 can then determine whether to provide a signal to a given visual indicator 106 independent of any sensor readings. In other words, the override signals take precedence over sensor readings when determining to which visual indicator 106, if any, the controller 102 should provide a signal. The override signal sources 108 can include a traffic signal, e.g. a "stop light," a pedestrian crossing signal, or a source of signals controlling the traffic signal and/or the pedestrian crossing signal. In an aspect, the override signal can correspond to a state of the traffic signal and/or pedestrian crossing signal. For example, a traffic signal can be providing an advanced green light, indicating a right of way to turn across lanes of oncoming traffic. The controller 102 can receive an override signal from the traffic signal or a source of signals provided to the traffic signal. In such an aspect, the controller 102 can provide the first visual indicator concurrent to the advanced green provided by the traffic signal. In another aspect, the controller 102 can refrain from providing a visual indicator 106. As another example, the controller can receive an override signal from a pedestrian crossing signal indicating that the pedestrian crossing signal is in a state indicating a right of way for crossing pedestrians. In such an aspect, the controller 102 can provide the second visual indicator, or no visual indicator.

In an aspect, the apparatus 100 can be embodied as an apparatus separate from a traffic signal. In such an aspect, the apparatus can be configured to be mounted or otherwise affixed to a traffic signal, or mounted on a same support structure as the traffic signal. In another aspect, the apparatus 100 can be embodied as a component of a traffic signal. In such an aspect, one or more components of the apparatus 100 can share functionality with one or more components performing functions of the traffic signal.

Figure 2:
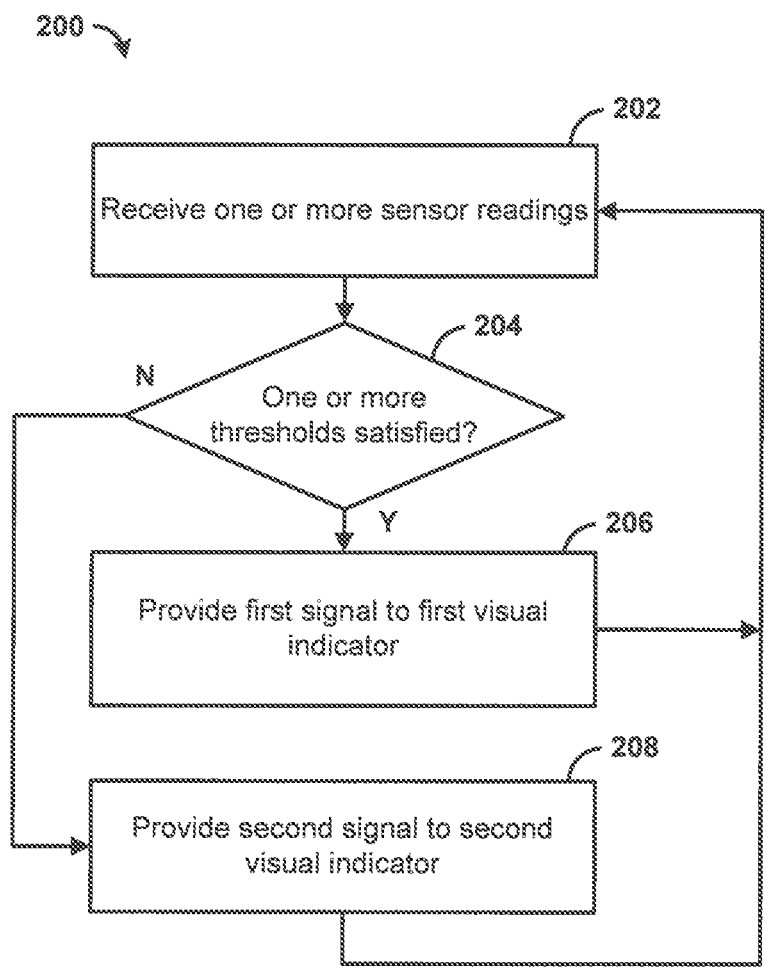
FIG. 2 is a flowchart of an example method.

FIG. 2 is a flowchart 200 of an example method. In an aspect, the method described in the flowchart 200 can be performed by a controller 102 of FIG. 1. Beginning with step 202, one or more sensor readings can be received. In an aspect, the one or more sensor readings can be received from one or more sensors 104. In an aspect, the one or more sensors 104 can include speed sensors, distance sensors, motion sensors, combinations thereof, or other sensors as can be appreciated. The one or more sensors 104 can include light-based sensors, sound-based sensors, or other types of sensors.

In an aspect, the one or more sensors 104 can include one or more first sensors configured to monitor one or more lanes of oncoming traffic. For example, the one or more first sensors 104 can be directed such that their range of detection encompasses a portion of the one or more lanes of oncoming traffic. In another aspect, the one or more sensors 104 can include one or more second sensors configured to monitor a pedestrian crossing parallel to one or more lanes of oncoming traffic, e.g. a pedestrian crossing that would be crossed by a vehicle turning across the one or more lanes of oncoming traffic. For example, the one or more second sensors 104 can be directed such that their range of detection encompasses the pedestrian crossing. In an aspect, the one or more sensors 104 can be calibrated based on a size of objects to be detected. For example, the one or more first sensors 104 can be calibrated to detect objects approximating a vehicle size (e.g. motorcycle, automobile) or greater, while the one or more second sensors 104 can be calibrated to detect objects approximating the size of a person, or greater.

Next, in step 204, it can be determined whether one or more thresholds are satisfied based on the one or more sensor readings. In an aspect, a threshold can be considered satisfied if a value compared against the threshold equals the threshold, falls above the threshold, or falls below the threshold. One skilled in the art can appreciate that various thresholds can be defined and satisfied according to the desired results. Determining whether the one or more thresholds are satisfied can include determining whether the one or more thresholds are satisfied by the one or more sensor readings. It can be determined if a distance threshold is satisfied by a sensor reading by a distance sensor. As another example, it can be determined if a speed threshold is satisfied by a sensor reading from a speed sensor. Determining whether the one or more thresholds are satisfied can also include determining whether the one or more thresholds are satisfied based on one or more values calculated based on the one or more sensor readings. For example, an estimated time value can be calculated based on a sensor reading from a distance sensor and a sensor reading from a speed sensor. The time value can comprise an estimated time for an object (e.g. a vehicle) to cover a distance. The distance can correspond to a distance from the object to the apparatus, a distance from the object to an entrance into an intersection, or a distance from the object to another point. The time value can then be compared to a time threshold to determine if the time value satisfies the time threshold. As a further example, determining whether the one or more thresholds are satisfied can include determining if a combination of thresholds are satisfied by a combination of sensor readings. For example, it can be determined if a distance reading falls below a distance threshold and a speed reading falls above a speed threshold, indicating that a nearby vehicle is approaching the intersection, thereby differentiating vehicles that are nearby but not approaching the intersection, e.g. a parked vehicle.

If the one or more thresholds are satisfied, the method can advance to step 206, where a first signal is provided to a first visual indicator indicating that crossing the one or more lanes of oncoming traffic is safe for a turning vehicle, e.g. a yellow or amber light. The method can then return to step 202, if, in step 204, the one or more thresholds are not satisfied, the method can advance to step 312 where a second signal can be provided to a second visual indicator indicating that crossing the one or more lanes of oncoming traffic is unsafe for a turning vehicle, e.g. a red light.

Figure 3:
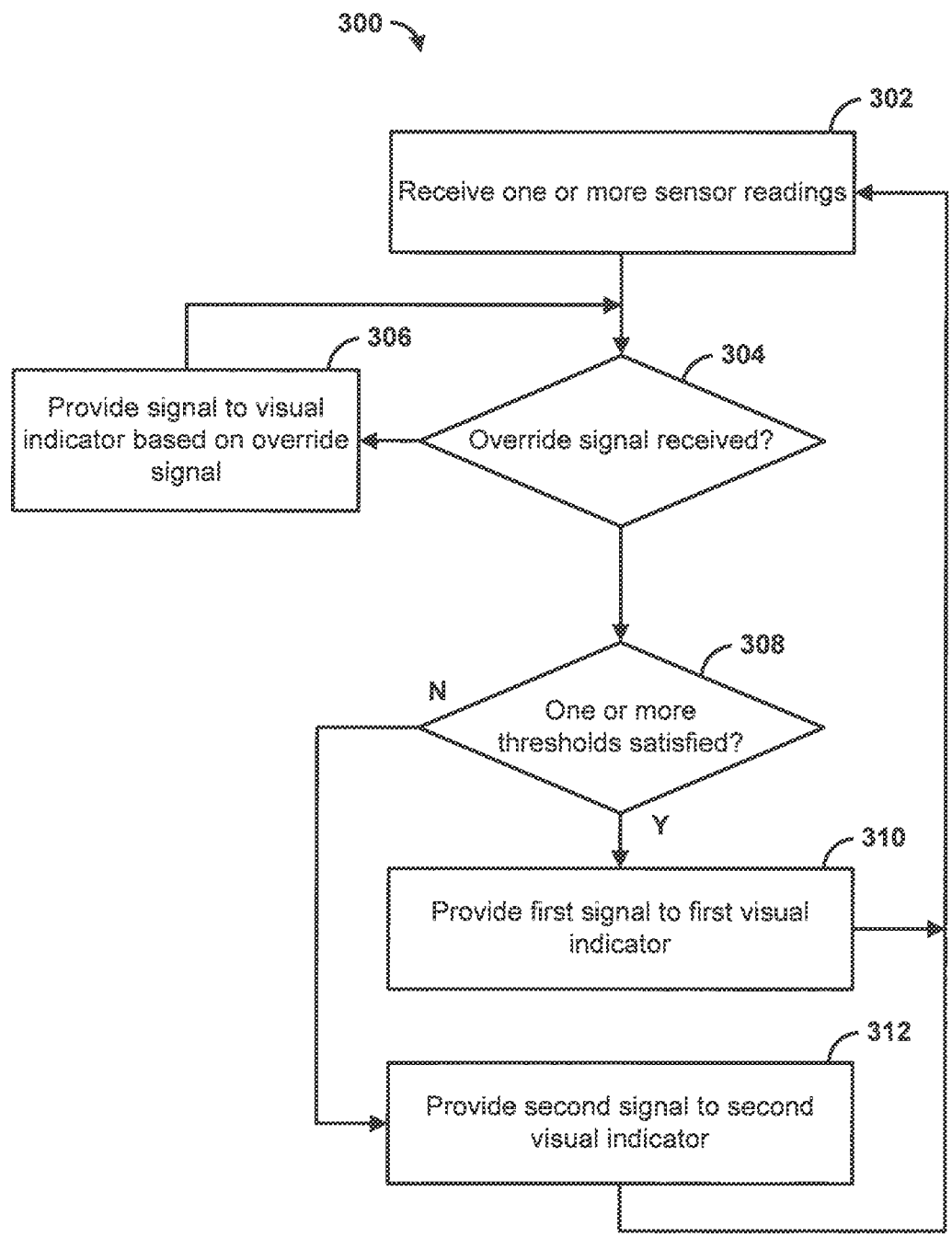
FIG. 3 is a flowchart of an example method.

FIG. 3 is a flowchart 300 of an example method. In an aspect, the method described in the flowchart 300 can be performed by a controller 102 of FIG. 1. Beginning with step 302, one or more sensor readings can be received. In an aspect, the one or more sensor readings can be received from one or more sensors 104. In an aspect, the one or more sensors 104 can include speed sensors, distance sensors, motion sensors, combinations thereof, or other sensors as can be appreciated. The one or more sensors 104 can include light-based sensors, sound-based sensors, or other types of sensors.

In an aspect, the one or more sensors 104 can include one or more first sensors configured to monitor one or more lanes of oncoming traffic. For example, the one or more first sensors 104 can be directed such that their range of detection encompasses a portion of the one or more lanes of oncoming traffic. In another aspect, the one or more sensors 104 can include one or more second sensors configured to monitor a pedestrian crossing parallel to one or more lanes of oncoming traffic, e.g. a pedestrian crossing that would be crossed by a vehicle turning across the one or more lanes of oncoming traffic. For example, the one or more second sensors 104 can be directed such that their range of detection encompasses the pedestrian crossing. In an aspect, the one or more sensors 104 can be calibrated based on a size of objects to be detected. For example, the one or more first sensors 104 can be calibrated to detect objects approximating a vehicle size (e.g. motorcycle, automobile) or greater, while the one or more second sensors 104 can be calibrated to detect objects approximating the size of a person, or greater.

Next, in step 304, it can be determined if one or more override signals are received. The one or more override signals can be received from one or more override signal sources 108. The override signal sources 108 can include a traffic signal, e.g. a "stop light," a pedestrian crossing signal, or a source of signals controlling the traffic signal and/or the pedestrian crossing signal. In an aspect, the override signal can correspond to a state of the traffic signal and/or pedestrian crossing signal. For example, a traffic signal can be providing an advanced green light, indicating a right of way to turn across lanes of oncoming traffic. The controller 102 can receive an override signal from the traffic signal or a source of signals provided to the traffic signal.

If, in step 304, an override signal was received, the method advances to step 306, where a signal is provided to a visual indicator 106 based on the override signal. In other words, provide a signal can be provided to a given visual indicator 106 independent of any sensor readings. Thus, the override signals take precedence over sensor readings when determining to which visual indicator 106, if any, should be provided a signal. For example, an override signal can be received indicating that an advanced green light is activated on a traffic signal. In such an embodiment, a signal can be provided to a first visual indicator indicating that it is safe to turn across the one or more lanes of oncoming traffic. The first visual indicator can be provided concurrent to the advanced green light. In another aspect, no signals can be provided to a visual indicator 106 when an override signal is received. As another example, an override signal can be received from a pedestrian crossing signal indicating that the pedestrian crossing signal is in a state indicating a right of way for crossing pedestrians. In such an aspect, the controller 102 can provide a second visual indicator indicating that it is unsafe to cross the one or more lanes (and therefore the pedestrian crossing), or provide no signal to any visual indicators 106.

If, in step 304, no override signal are received, the method advances to step 308 where it can be determined whether one or more thresholds are satisfied based on the one or more sensor readings. In an aspect, a threshold can be considered satisfied if a value compared against the threshold equals the threshold, falls above the threshold, or falls below the threshold. One skilled in the art can appreciate that various thresholds can be defined and satisfied according to the desired results. Determining whether the one or more thresholds are satisfied can include determining whether the one or more thresholds are satisfied by the one or more sensor readings. It can be determined if a distance threshold is satisfied by a sensor reading by a distance sensor. As another example, it can be determined if a speed threshold is satisfied by a sensor reading from a speed sensor. Determining whether the one or more thresholds are satisfied can also include determining whether the one or more thresholds are satisfied based on one or more values calculated based on the one or more sensor readings. For example, an estimated time value can be calculated based on a sensor reading from a distance sensor and a sensor reading from a speed sensor. The time value can comprise an estimated time for an object (e.g. a vehicle) to cover a distance. The distance can correspond to a distance from the object to the apparatus, a distance from the object to an entrance into an intersection, or a distance from the object to another point. The time value can then be compared to a time threshold to determine if the time value satisfies the time threshold. As a further example, determining whether the one or more thresholds are satisfied can include determining if a combination of thresholds are satisfied by a combination of sensor readings. For example, it can be determined if a distance reading falls below a distance threshold and a speed reading falls above a speed threshold, indicating that a nearby vehicle is approaching the intersection, thereby differentiating vehicles that are nearby but not approaching the intersection, e.g. a parked vehicle.

If the one or more thresholds are satisfied, the method can advance to step 310, where a first signal is provided to a first visual indicator indicating that crossing the one or more lanes of oncoming traffic is safe for a turning vehicle, e.g. a yellow or amber light. The method can then return to step 302. If, in step 308, the one or more thresholds are not satisfied, the method can advance to step 312 where a second signal can be provided to a second visual indicator indicating that crossing the one or more lanes of oncoming traffic is unsafe for a turning vehicle, e.g. a red light.

Figure 4:
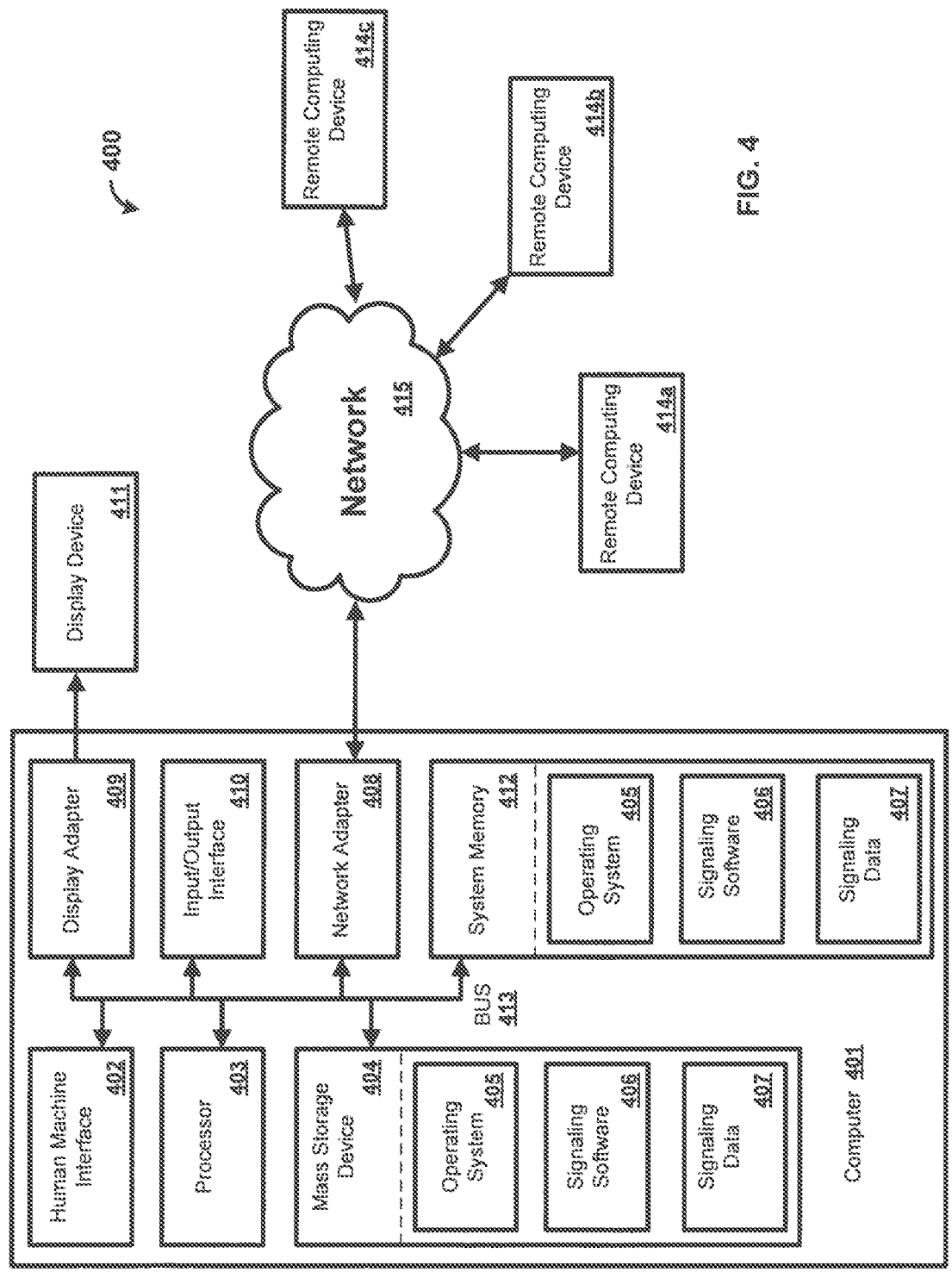
FIG. 4 is a block diagram of an example computing device.

In an exemplary aspect, the methods and systems can be implemented on a computer 401 as illustrated in FIG. 4 and described below. By way of example, the controller 102 of FIG. 1 can be a computer as illustrated in FIG. 4. Similarly, the methods and systems disclosed can utilize one or more computers to perform one or more functions in one or more locations. FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

FIG. 4 shows an exemplary environment 400 in which the present systems and methods may be implemented. Further, one skilled in the art will appreciate that the systems and methods disclosed herein can be implemented via a general-purpose computing device in the form of a computer 401. The components of the computer 401 can comprise, but are not limited to, one or more processors 403, a system memory 412, and a system bus 413 that couples various system components including the one or more processors 403 to the system memory 412. The system can utilize parallel computing.

The system bus 413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the one or more processors 403, a mass storage device 404, an operating system 405, signaling software 406, signaling data 407, a network adapter 408, the system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as the signaling data 407 and/or program modules such as the operating system 405 and the signaling software 406 that are immediately accessible to and/or are presently operated on by the one or more processors 403.

In another aspect, the computer 401 can also comprise other removable/non-removable, volatile/non-volatile computer storage media. By way of example, FIG. 4 illustrates the mass storage device 404 which can provide non-volatile storage of computer code, computer readable instructions, data structures, program modules, and other data for the computer 401. For example and not meant to be limiting, the mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way, of example, the operating system 405 and the signaling software 406. Each of the operating system 405 and the signaling software 406 (or some combination thereof) can comprise elements of the programming and the signaling software 406. The signaling data 407 can also be stored on the mass storage device 404. The signaling data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 403 via the human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, the display device 411 can also be connected to the system bus 413 via an interface, such as the display adapter 409. It is contemplated that the computer 401 can have more than one display adapter 409 and the computer 401 can have more than one display device 411. For example, the display device 411 can be a monitor, an LCD (Liquid Crystal Display), or a projector. In addition to the display device 411, other output peripheral devices can comprise components such as speakers (not shown) and a printer (not shown) which can be connected to the computer 401 via the Input/Output Interface 410. Any step and/or result of the methods can be output in any form to an output device. Such output can be any form of visual representation, including, but not limited to, textual, graphical, animation, audio, tactile, and the like. The display device 411 and computer 401 can be part of one device, or separate devices.

The computer 401 can operate in a networked environment using logical connections to one or more remote computing devices 414a,b,c. By, way of example, a remote computing device can be a personal computer, portable computer, smartphone, a server, a router, a network computer, a peer device or other common network node, and so on. Logical connections between the computer 401 and a remote computing device 414a,b,c can be made via a network 415, such as a local area network (LAN) and/or a general wide area network (WAN). Such network connections can be through the network adapter 408. The network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the one or more processors 403 of the computer. An implementation of the signaling software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 5:
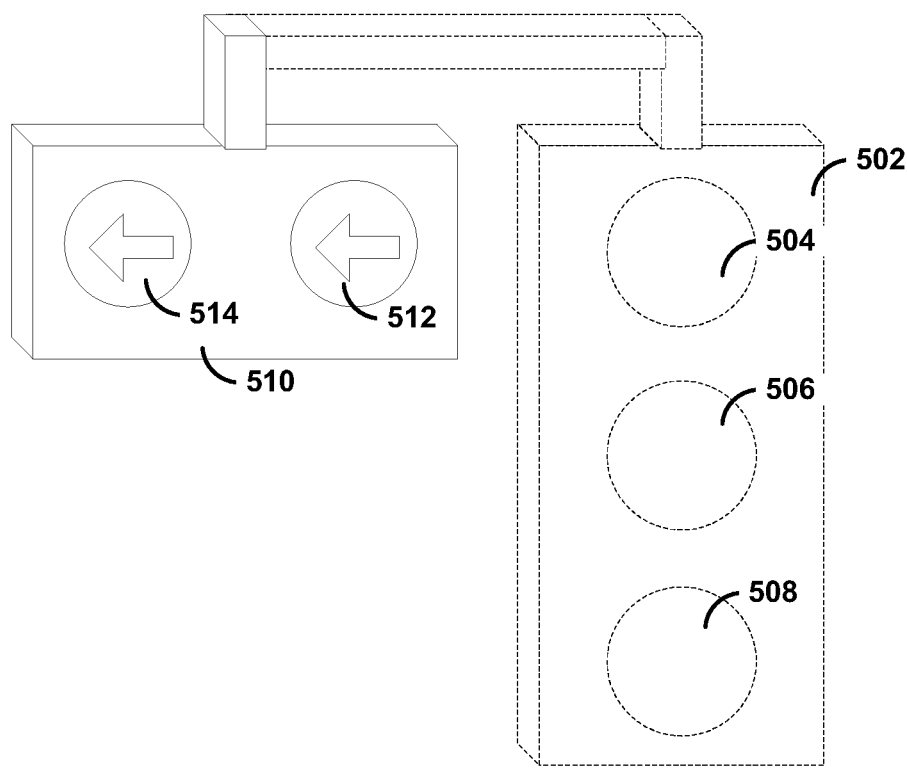
FIG. 5 is an example apparatus.

FIG. 5 shows an example apparatus 500. The example apparatus 500 is shown relative to a traffic signal 502 as understood by one skilled in the art, e.g. including a red light 504, amber/yellow light 506 and green light 508. The traffic signal 502 is secured to a cable or other support structure by a mounting 510. The mounting 510 can include one or more signaling cables delivering signals controlling which of the red light 504, amber/yellow light 506 or green light 508 are activated at a given moment. Accordingly, the mounting 510 can serve to communicatively couple the apparatus 500 to one or more override signal sources 108.

The apparatus 500 includes a casing 510 encasing one or more of the controller 102 and/or the sensors 104. The example apparatus includes a yellow light 512 and red light 514, corresponding to first and second visual indicators 106, respectively. It is noted that the apparatus 500 is merely exemplary, and other variations can be apparent to one skilled in the art. For example, the apparatus 500 can share a casing 510 with the traffic signal 502. As another example, one or more lights can be added to or removed from the yellow light 512 and red light 514. As a further example, signaling devices other than a yellow light 512 and red light 514 can be used, such as a text or light emitting diode (LED) display to display images and/or text, or other visual signals.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of lode with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
receiving, by a controller, from a plurality of first sensors configured to monitor one or more lanes of parallel oncoming traffic in a direction of travel of a vehicle, one or more first sensor readings, wherein the plurality of first sensors are calibrated to detect objects equal to or greater than a first size, wherein the plurality of first sensors comprises a distance sensor, a speed sensor, a sound sensor, and a motion sensor;
receiving, by the controller, from a plurality of second sensors configured to monitor a pedestrian crossing parallel to the one or more lanes of parallel oncoming traffic, one or more second sensor readings, wherein the plurality of second sensors are calibrated to detect objects of a second size, wherein the first size is greater than the second size;
determining, by the controller, whether the one or more first sensor readings and the one or more second sensor readings satisfy one or more thresholds, wherein the one or more thresholds comprises one or more of a speed threshold and a distance threshold, and wherein a first threshold of the one or more thresholds is greater than a second threshold of the one or more thresholds;
sending, to a first visual indicator comprising one or more lighting elements, based on the one or more first sensor readings and the one or more second sensor readings satisfying the second threshold and the one or more first sensor readings and the one or more second sensor readings not satisfying the first threshold, a first signal, wherein the first visual indicator is affixed to a traffic signal;
sending, to a second visual indicator comprising one or more lighting elements, based on the one or more first sensor readings and the one or more second sensor readings not satisfying the second threshold, a second signal, wherein the second visual indicator is affixed to the traffic signal;
sending, to a third visual indicator comprising one or more lighting elements, based on the one or more first sensor readings and the one or more second sensors readings satisfying the first threshold, a third signal, wherein the third visual indicator is affixed to the traffic signal;
causing, based on the first signal, the first visual indicator to display a first visual indication, wherein the first visual indication indicates a potential to move across the one or more lanes of parallel oncoming traffic in the direction of travel;
causing, based on the second signal, the second visual indicator to display a second visual indication, wherein the second visual indication indicates a caution against crossing the one or more lanes of parallel oncoming traffic by the vehicle; and
causing, based on the third signal, the third visual indicator to display a third visual indication, wherein the third visual indication indicates that crossing the one or more lanes of parallel oncoming traffic is safe for the vehicle.

2. The method of claim 1, wherein the one or more thresholds comprises a time threshold, and the method further comprises:
determining a speed of an oncoming vehicle;
determining, based on the speed of the oncoming vehicle and a distance to the oncoming vehicle from the distance sensor of the plurality of first sensors, a time value; and
wherein determining whether the one or more thresholds associated with the one or more first sensor readings is satisfied comprises determining whether the time value satisfies the time threshold.

3. The method of claim 1, further comprising:
receiving an override signal corresponding to a state of the traffic signal; and
determining whether to provide the first signal to the first visual indicator based on the override signal and independent of the one or more thresholds.

4. The method of claim 3, wherein the override signal corresponds to one or more of an advance green signal or a stop light signal.

5. An apparatus, comprising:
a plurality of first sensors configured to monitor one or more lanes of parallel oncoming traffic in a direction of travel of a vehicle;
a plurality of second sensors configured to monitor a pedestrian crossing parallel to the one or more lanes of parallel oncoming traffic;
one or more visual indicators each comprising one or more lighting elements;
a controller configured to at least:
receive, from the plurality of first sensors, one or more first sensor readings wherein the plurality of first sensors are further calibrated to detect objects equal to or greater than a first size, wherein the plurality of first sensors comprises a distance sensor, a speed sensor, a sound sensor, and a motion sensor;
receive, from the plurality of second sensors, one or more second sensor readings, wherein the plurality of second sensors are further calibrated to detect objects of a second size, wherein the first size is greater than the second size;
determine whether the one or more first sensor readings and the one or more second sensor readings satisfy one or more thresholds, wherein the one or more thresholds comprises one or more of a speed threshold and a distance threshold, and wherein a first threshold of the one or more thresholds is greater than a second threshold of the one or more thresholds;
send, based on the one or more first sensor readings and the one or more second sensor readings satisfying the second threshold and the one or more first sensor readings and the one or more second sensor readings not satisfying the first threshold, a first signal to a first visual indicator of the one or more visual indicators, wherein the first visual indicator is affixed to a traffic signal;
send, based on the one or more first sensor readings and the one or more second sensor readings not satisfying the second threshold, a second signal to a second visual indicator of the one or more visual indicators, wherein the second visual indicator is affixed to the traffic signal;
send, based on the one or more first sensor readings and the one or more second sensor readings satisfying the first threshold, a third signal to a third visual indicator of the one or more visual indicators, wherein the third visual indicator is affixed to the traffic signal;

cause, based on the first signal, the first visual indicator to display a first visual indication, wherein the first visual indication indicates a potential to move across the one or more lanes of parallel oncoming traffic in the direction of travel;

cause, based on the second signal, the second visual indicator to display a second visual indication, wherein the second visual indication indicates a caution against crossing across the one or more lanes of parallel oncoming traffic in the direction of travel; and cause, based on the third signal, the third visual indicator to display a third visual indication, wherein the third visual indication indicates that crossing the one or more lanes of parallel oncoming traffic in the direction of travel is safe for the vehicle.

6. The apparatus of claim 5, wherein the one or more thresholds comprises a time threshold, and the controller is further configured to:

determine a speed of an oncoming vehicle;

determine, based on the speed of the oncoming vehicle and a distance to the oncoming vehicle from the distance sensor of the plurality of first sensors, a time value; and wherein determining whether the one or more thresholds associated with the one or more first sensor readings is satisfied comprises determining whether the time value satisfies the time threshold.

7. The apparatus of claim 5, wherein the controller is further configured to:

receive an override signal corresponding to a state of the traffic signal; and determine whether to provide the first signal based on the override signal and independent of the one or more thresholds.

8. The apparatus of claim 7, wherein the override signal corresponds to one or more of an advanced green signal or a stop light signal.

9. The apparatus of claim 7, wherein the override signal is received from one or more of: the traffic signal, or a source of traffic signaling communicatively coupled to the traffic signal.

* * * * *